April 24, 1945. H. C. FUERSTENBERG 2,374,278
TWO-WHEEL CART
Filed Aug. 14, 1942
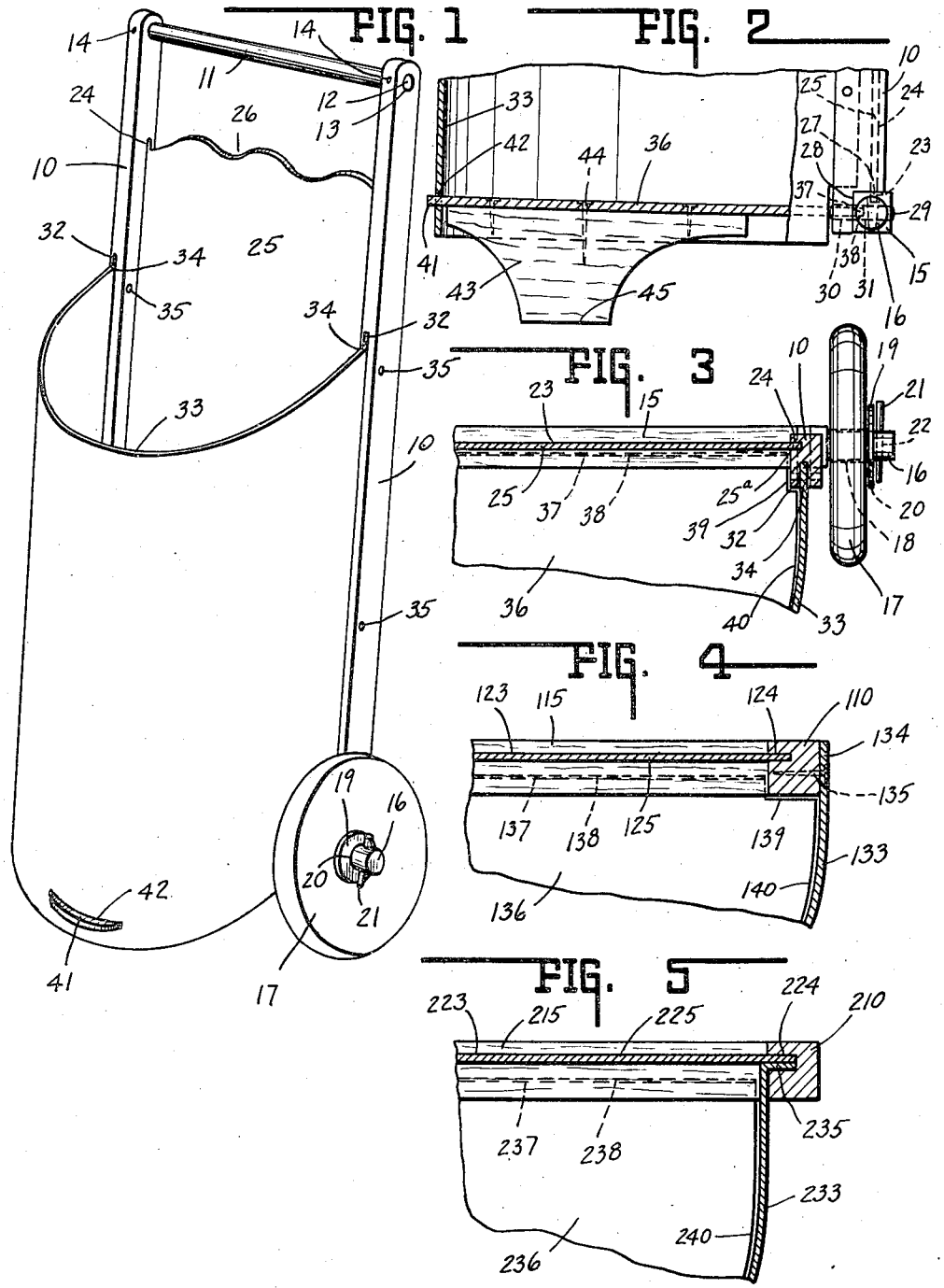
INVENTOR.
HERBERT C. FUERSTENBERG.
BY Lockwood, Goldsmith & Galt
ATTORNEYS.

Patented Apr. 24, 1945

2,374,278

UNITED STATES PATENT OFFICE 2,374,278

TWO-WHEEL CART

Herbert C. Fuerstenberg, Indianapolis, Ind.

Application August 14, 1942, Serial No. 454,808

4 Claims. (Cl. 280—51)

This invention relates to a two-wheel cart and more particularly the peculiarities of its construction and one wherein, if desired, substantially no metal parts are necessary or required.

The chief object of this invention is to provide a two-wheel cart that can be readily transported, propelled or drawn, and which can be self-supporting when positioned in erect relation.

The chief feature of the invention consists in providing what might be termed a relatively rigid U-shaped frame, having the free ends secured to an axle, this forming a skeleton frame for the cart, and to which may be secured a minimum of three members to-wit: back, bottom, and front and sides, axle projecting portions supporting the wheels and to which may be added, when self-sustainment is desired, a foot rest, preferably positioned in spaced relation to the wheels, and medianly thereof, for three point bearing support of the cart.

Other objects and features of the invention will be set forth more fully hereinafter.

The full nature of the invention will be understood from the accompanying drawing and the following description and drawing.

In the drawing

Fig. 1 is a perspective view of one embodiment of the invention.

Fig. 2 is a side elevation of the lower portion of the cart, the wheels being removed and a portion of the side being broken away to show a portion of the bottom and front in substantially central section and the foot rest in elevation.

Fig. 3 is a transverse sectional view of one lower corner of the cart.

Fig. 4 is a view somewhat similar to Fig. 3 and of a modified form of back and side member connection to the arm, the wheels, etc., being omitted.

Fig. 5 is a view similar to Fig. 4 and of still further modified form of connection, the wheels, etc., being omitted.

Reference will now be had to Figs. 1 to 3, inclusive, wherein the preferred form of the invention is illustrated by way of example only.

In this form of the invention there is illustrated two arm portions 10 that are comparatively elongated and are positioned substantially parallel and in pre-determined spaced relation. The ends of these arms may be, as illustrated in Fig. 1, connected by a handle portion 11, which at each end is reduced, forming portions 12 press fitted or the like in apertures 13 in what might be termed the upper ends of the arms. Now, a nail or pin 14 may be passed through the arm and portion 12, and thus secure the handle portion to the arm portions in rigid relation, thereby forming in effect what may be termed a substantially U-shaped arrangement.

Referring to Figs. 2 and 3, 15 indicates an axle, which herein is shown rectangular in cross section and it is to be understood that each end thereof is reduced to cylindrical form as indicated at 16. A disc-like wood wheel 17 is apertured at 18 and is rotatably supported by the spindle portion 16. A fibre, or like, disc 19, also apertured at 20, is similarly mounted on the spindle and then a tapered pin 21 is passed through the tapered hole 22 in the end of the axle to retain the wheel and fibre disc thereon.

It will be observed from Fig. 3 that the wheels are outside of the arms of the U-shaped handle arrangement. The upper face of the axle is grooved as at 23. The two confronting faces of arm portions 10 are longitudinally and similarly grooved as at 24. A back member 25 having a suitably outlined, or upper edge conformation 26, has its side edges seated in the grooves 24, as indicated at 25a, and the bottom edge of the back member 25, and indicated by the numeral 27 in Fig. 2, is seated in the axle groove 23. When the lower ends of the arms 10 are rigidly secured to the axle 15, it is quite apparent that a rectangular open framework results that is rigid, and the back member 25 cannot escape from its groove mountings.

As shown in Fig. 3, the arm 10 is offset slightly relative to the axle 15 and the lower end of the arm is angularly notched as at 28, see Fig. 2, so as to engage two sides of the axle 15. It is pinned to the axle by the dowel 29 that extends through registering apertures 30 and 31 in the reduced portion of the arm 10 and the axle 15 immediately adjacent the spindle portion, respectively. By this construction it is understood that the arms 10 are prevented from spreading outwardly, or collapsing inwardly, at the upper and lower ends, the result being, as previously set forth, a relatively rigid rectangular-like open framework in which is mounted back member 25.

The front face of the arms 10 is longitudinally grooved as at 32 and a U-shaped sectioned front and side member 33 has its rearward side edges 34 seated in these grooves 32 and retained in said grooves by any suitable retainers, such as the dowels or pins 35.

A bottom member 36 has its rearward edge 37 seated in a groove 38 in the forward face of the axle. It is to be understood that the two grooves 23 and 38 do not extend the full length of the enlarged portion of the axle and that the two grooves, which are transverse of each other, do not terminate immediately adjacent each other, but as shown in Fig. 2 are slightly offset. This, therefore, does not destroy the solidity of the axle.

The bottom member 36 is rectangularly notched at its two rear corners, as shown clearly at 39, in Fig. 3, so as to pass around the inner and forward faces of each arm and thus clear same. The edge 40 of the bottom member 36 conforms to the U-shaped outline, or other outlines of the combination front and side member 33, except as will now be pointed out.

One or more tongues 41 may be provided on this edge 40 and project outwardly therefrom and through one or more slots 42 formed in the lower portion of the member 33. In this manner the bottom member is retained in assembled relation by means of the axle and the combination front and side member. This is not the only method of mounting, for whenever desired, the rear edge 37 of the member 36 may overlie the axle and be tacked thereto, or underlie the axle and be nailed thereto, although the latter is not as preferable as the former, and both of these methods are not as desirable as that specifically illustrated. When only one tongue 41 is provided in the bottom member, it preferably is medianly positioned, as shown in Fig. 1.

The aforesaid constitutes a two-wheel arrangement that may be picked up and readily carried and transported in an automobile, or the like, and which can be pushed or which can be pulled. Whenever it is desired to have such a cart to be self-sustaining, a foot rest, such as illustrated in Fig. 2, between the wheels 17 and indicated by the numeral 43, may be provided and such a foot rest is shown secured by means of nails, or the like, 44 passing through the bottom member 36 and into the member 43. This member 43 is preferably medianly positioned and its bearing face 45 is positioned at considerable distance forwardly from a plane, including the axle 15 and said member lies in a plane perpendicular to the bottom member 36 and the back member 25. Since member 43 is positioned medianly between the wheels 17 as stated and is of sufficient depth and length as illustrated, a three-point bearing will result, including the face 45 and the two wheels 17. This three-point bearing permits the cart to be self-sustaining when in a substantially vertical position.

While the arms 10 are herein shown separate from the handle member 11, it is to be understood that the handle 11 may be integral with the arms 10, and this may be effected by utilizing a single length of material and bowing the central portion, so that again a U-shaped handle arrangement is formed. With this type of arrangement, the back member is inserted in the grooves 24 and then the axle is pinned in place, then the bottom member and the U-shaped front and side member are associated together and the rear edges of both members are then seated in the axle groove 23 and the arm grooves 32, respectively, and when the tongue portions 34 are pinned as at 35, the construction is complete, except for mounting of the wheels.

The foot rest, preferably, is applied to the bottom member prior to its association with the front and side members, although it may be applied thereto after the structure is assembled.

Reference will now be had to Fig. 4 wherein a modified form of the invention is illustrated. In this form of the invention the back member 125 is associated with the arms 110 by seating in the confronting slots 124 thereof and with the axle 115 by seating in groove 123 thereof. Also, the bottom member 136 is similarly associated with the front and side member 133 at its forward edge and with the axle 115, as previously set forth. Herein, however, the said faces of the arms are not grooved longitudinally, but the portion 134 of the side member 133 is nailed as at 135 to the arm. This, it will be noted, provides a slightly larger volume container than that illustrated in Fig. 1. The outward extension of axle member 115, together with its wheel and mounting connection is omitted in the illustration Fig. 4, although this structure includes same, for the purpose of Fig. 4 is only to illustrate the modification connection between members 133 and 110 as compared to 33 and 10 in Fig. 3 and that arm member 110 is not herein offset relative to axle 115 as illustrated in Fig. 3.

Referring to Fig. 5, it will be observed that the back member 225 is similarly associated with the axle 215 at its lower edge and its side edge is seated in the notch 224 in the arm 210. This notch is wider than those previously illustrated and herein the front and side member 233 has a side edge 235 extending angularly of the side portion and the same is also seated in this same slot 224 as shown. The bottom member 236 is associated with the lower forward portion of the side member, as illustrated in Figs. 1 and 2, and the rear edge of the bottom member is similarly associated with the axle as illustrated in Figs. 2 and 3. As previously set forth relative to Fig. 4, the wheels, axle extension, etc., are again omitted in Fig. 5. In this figure, arm 210 is likewise not offset relative to axle 215 (as illustrated in Fig. 3) but registers therewith as illustrated in Fig. 4.

The several members, 25, 33 and 36, may be of plywood, or any other suitable material and one which has been found suitably satisfactory is that known as "Randalite." This material consists of one central layer of veneer faced with outer layers of kraft paperboard. This particular material, or one equivalent to it, is not only flexible, but has quite a bit of stiffness and has sufficient strength and stability for load supporting and like purposes. It also has the advantages that it can be readily covered with paint, lacquer, or the like, so that a cart of this character may be decorated in any desired or preferred manner. Since substantially all the portions are wood, the entire cart can be readily decorated as desired.

The purpose of utilizing a retaining disc 19, see Fig. 3, of appreciable diameter and bearing against a retaining pin 21 of appreciable length is to prevent cocking of the wheels on the axle.

While the invention has been illustrated and described in great detail in the drawing and foregoing description, the same is to be considered as illustrative and not restrictive in character.

The several modifications described herein as well as others which will readily suggest themselves to persons skilled in this art, all are considered to be within the broad scope of the invention, reference being had to the appended claims.

The invention claimed is:

1. A two-wheel cart including a wheel supporting axle and a substantially U-shaped handle means having elongated substantially parallel arms secured at their free ends to the axle adjacent the wheel mounting portions thereof, the axle, arms and handle means forming a closed frame structure, a back member, a front and side forming member, and a bottom member, the back member extending across the handle means from arm to arm and secured thereto, the front-side member having its opposite ends also secured to the arms, the bottom member being secured at its forward edge to the front member and at its rearward edge being operatively secured to the axle, the axle being grooved longitudinally and between the ends, the lower end of said back member seating in the axle groove.

2. A two-wheel cart including a wheel supporting axle and a substantially U-shaped handle means having elongated substantially parallel arms secured at their free ends to the axle adjacent the wheel mounting portions thereof, the axle, arms and handle means forming a closed frame structure, a back member, a front and side forming member, and a bottom member, the back member extending across the handle means from arm to arm and secured thereto, the front-side member having its opposite ends also secured to the arms, the bottom member being secured at its forward edge to the front member and at its rearward edge being operatively secured to the axle, the front and bottom members having a tongue and slot connection therebetween, the rear end of the bottom member being of tongue type for support by the axle.

3. A two-wheel cart including a wheel supporting axle and a substantially U-shaped handle means having elongated substantially parallel arms secured at their free ends to the axle adjacent the wheel mounting portions thereof, the axle, arms and handle means forming a closed frame structure, a back member, a front and side forming member, and a bottom member, the back member extending across the handle means from arm to arm and secured thereto, the front-side member having its opposite ends also secured to the arms, the bottom member being secured at its forward edge to the front member and at its rearward edge being operatively secured to the axle, the arms and axle each being grooved longitudinally; the side edge portions of the back member seating in the arm grooves and the bottom edge portion of said back member seating in the axle groove.

4. A two-wheel cart including a pair of elongated substantially parallel arms having longitudinal grooves in their confronting faces and similarly directed grooves in their forward faces, a wheel supporting axle longitudinally grooved in its upper face and secured adjacent the wheel mounting portions thereof to the lower ends of said arms, a back member having its side edge portions seated in the arm confronting grooves and its lower edge portion seated in the axle groove, a U-shaped sectioned front and side member having its rear side edge portions seated in and secured to forward face grooves of the arms, a transverse handle portion spaced from the top edge of the back member and secured at opposite ends to the upper ends of the arms, the axle, arms and handle portion forming the rigid skeleton frame of the cart, and a bottom member secured at its forward edge to the U-shaped member and supported at its rearward edge by the axle.

HERBERT C. FUERSTENBERG.